(12) United States Patent
Krovats

(10) Patent No.: US 7,168,210 B2
(45) Date of Patent: Jan. 30, 2007

(54) SUPPORT BLOCK AND SYSTEM FOR USE ON ROOFS

(76) Inventor: Neil Krovats, 1448 Wellington Crescent, Winnipeg, Manitoba (CA) R3N 0B7

( * ) Notice: Subject to any disclaimer, the term of this patent is extended or adjusted under 35 U.S.C. 154(b) by 0 days.

(21) Appl. No.: 10/703,479

(22) Filed: Nov. 10, 2003

(65) Prior Publication Data

US 2005/0097836 A1    May 12, 2005

(51) Int. Cl.
*E04B 1/98* (2006.01)
*E04H 9/02* (2006.01)

(52) U.S. Cl. .......... 52/167.9; 52/699; 52/701; 52/703; 52/698; 52/167.1; 52/167.7; 52/167.8

(58) Field of Classification Search .......... 52/503–505, 52/574–576, 596–612, 698–715, 167.1, 167.7, 52/167.8, 167.9, 41, 44, 57, 90.1, 90.2
See application file for complete search history.

(56) References Cited

U.S. PATENT DOCUMENTS

| | | | | |
|---|---|---|---|---|
| 3,482,061 A | * | 12/1969 | Grado ........................ 369/139 |
| 3,995,901 A | * | 12/1976 | Filbert et al. ................ 293/136 |
| 4,336,577 A | * | 6/1982 | Hanson ....................... 362/267 |
| 4,469,316 A | * | 9/1984 | van den Boom et al. ..................... 267/140.13 |
| 5,122,405 A | * | 6/1992 | Landi .......................... 428/116 |
| 5,442,883 A | * | 8/1995 | Nishimura et al. ......... 52/167.2 |
| 5,479,750 A | * | 1/1996 | Carlberg ....................... 52/300 |
| 5,595,032 A | * | 1/1997 | Richards et al. .............. 52/306 |
| 5,743,356 A | * | 4/1998 | Mitchell ..................... 182/214 |
| 5,786,563 A | * | 7/1998 | Tiburzi ....................... 219/213 |
| 5,857,297 A | * | 1/1999 | Sawyer ...................... 52/169.5 |
| 5,950,832 A | * | 9/1999 | Perlman ..................... 206/446 |
| 6,082,780 A | * | 7/2000 | Rowley et al. .......... 285/132.1 |
| 6,139,531 A | * | 10/2000 | Danby ........................ 604/153 |
| 6,192,649 B1 | * | 2/2001 | Karim-Panahi et al. .. 52/741.15 |
| 6,520,456 B1 | | 2/2003 | Neider et al. |
| 6,790,520 B1 | * | 9/2004 | Todd et al. ............... 428/318.4 |

FOREIGN PATENT DOCUMENTS

| CA | 2107707 | | 4/1995 |
|---|---|---|---|
| EP | 168767 A2 | * | 1/1986 |
| JP | 08093836 A | * | 4/1996 |
| JP | 09137617 A | * | 5/1997 |

* cited by examiner

*Primary Examiner*—Jeanette E. Chapman
(74) *Attorney, Agent, or Firm*—Ryan W. Dupuis; Adrian D. Battison; Michael R. Williams

(57) ABSTRACT

A support block for supporting objects on a roof. The support block is a moulded elastomeric block of pyramidal shape with a substantially hollow core. The support block can be used as is or in a system whereby a galvanized steel channel is secured to the top wall of the block accommodating the mating of a variety of clamps.

12 Claims, 4 Drawing Sheets

SUPPORT BLOCK AND SYSTEM FOR USE ON ROOFS

FIELD OF THE INVENTION

The present invention relates to support blocks. In particular, the present invention relates to blocks for supporting objects found on rooftops, for example pipes.

BACKGROUND

Various service units are found on the roofs of buildings, particularly commercial buildings. These service units will often have pipes and ductwork that snake along the rooftop. Furthermore, roof walkway systems are often present to facilitate access to the service units. These rooftop objects usually require supports to prevent damage to the roof surface.

The simplest support solution is the use of blocks of wood to support an object at intervals along its length. Although this simple support device has a number of drawbacks. A rooftop object being supported often vibrates causing vibrations to be transmitted through the block of wood. The result is excessive noise and movement of the block. It is conceivable that the block could move enough that it no longer supports the object it is intended to. Furthermore, this excessive movement may cause damage to the roofs surface requiring expensive repairs.

The wood blocks could be nailed to the roof but this could cause future leaks if not sealed properly. In any event, wood will deteriorate over time due to weathering and could possibly break loose.

Support systems according to the present invention are intended to mitigate these problems.

SUMMARY

According to one aspect of the present invention there is provided a support block for supporting objects providing vibration dampening, said block comprising a substantially hollow block of a self damping elastomeric material having a substantially flat bottom, two end walls perpendicular to the bottom, and a flat top wall.

The elastomeric material reduces the transmission of vibrations from the supported object to the roof surface, thereby extended roof life. The hollow design enhances the vibration dampening qualities of the support block. Furthermore, the hollow design greatly reduces the shipping weight of the support blocks. Preferably, the support block is moulded as a single length from an elastomeric material, for example recycled tires. The single length can be cut into custom length units depending on the application. The support block is UV resistant to prevent photo-degradation. The use of recycled materials provides for an environmentally friendly method of manufacturing.

According to another aspect of the present invention there is provided a support system for supporting objects providing vibration dampening, said system comprising:

a support block for supporting objects on a roof comprising a substantially hollow block of a self damping elastomeric material having a substantially flat bottom, two end walls perpendicular to the bottom, and a flat top wall;

a channel secured to the top wall of the support block providing a platform for securing objects; and a clamp that mates to the channel for securing objects to the support block.

Preferably, the channel is made from galvanized steel to reduce the effects of weather corrosion. The term "clamp" refers to a variety of different devices, for example pipe clamps, cable clamps, electrical fittings, saddles, brackets, spring bolts, beam clamps, roller clamps, and variable angle support legs.

According to another aspect of the present invention there is provided a support system for supporting objects providing vibration dampening, said system comprising:

at least two support blocks for supporting objects on a roof comprising a substantially hollow block of a self damping elastomeric material having a substantially flat bottom, two end walls perpendicular to the bottom, and a flat top wall; and a channel secured to the top wall of each of the least two support blocks interconnecting the at least two support blocks providing a platform for supporting objects;

This aspect of the present invention provides a superior vibration dampening sleeper support for large objects. For example, HVAC equipment, cable trays, roof walkway systems, and refrigeration equipment require supports to spread their weight over larger surface areas. The use of multiple interconnected support blocks provides an economical solution for supporting large objects.

BRIEF DESCRIPTION OF THE DRAWINGS

In the accompanying drawings, which illustrate exemplary embodiments of the present invention.

DETAILED DESCRIPTION

Figure 2:
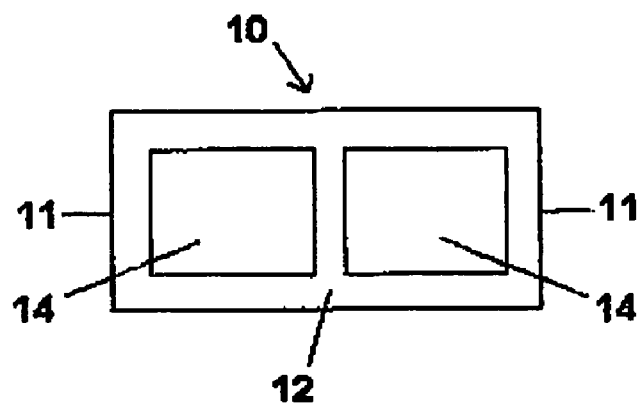
FIG. 2 is a bottom view of a support block of the present invention.

Referring to the accompanying drawings, there is illustrated a support block 10 moulded from recycled tires. The support block has end walls 11 perpendicular to bottom wall 12 and a flat top wall 13. FIG. 2 shows the underside of the support block having hollowed out cavities 14.

The block is moulded into lengths and cut to a specifically sized unit according to the application. In use, the support block 10 is placed on a roof 20 beneath an object 22, for example a pipe. The support device can be adhered to the roof surface if desired with polyurethane adhesives. The elastomeric construction of the support provides sound dampening of vibrating objects 22. In addition, the vibration dampening nature of the block prevents excessive wear to the roof 20.

Figure 1:
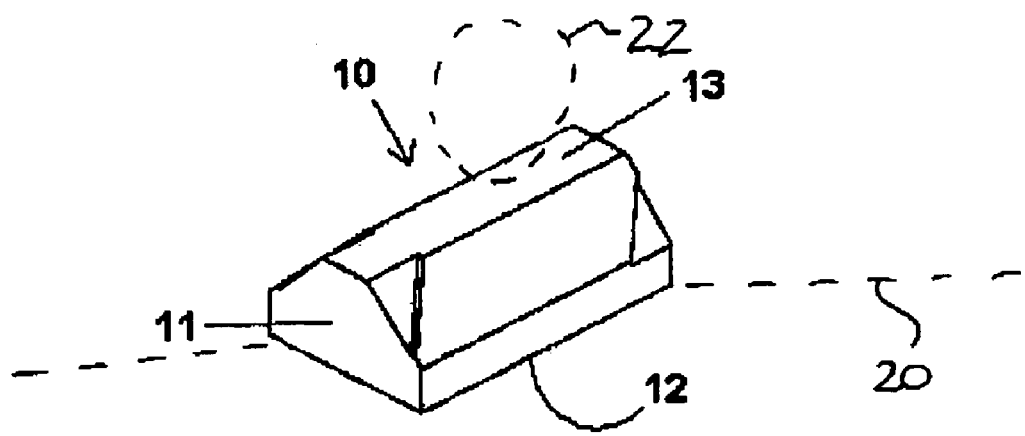
FIG. 1 is an isometric view of a support block of the present invention.
Figure 3:
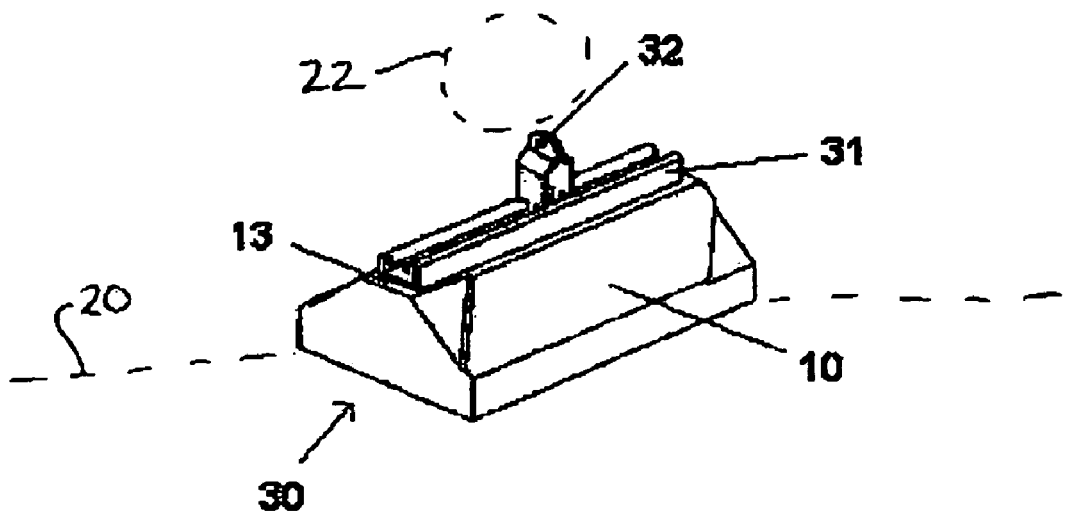
FIG. 3 is an isometric view of a support block having a galvanized steel channel secured to its top wall.

Referring to FIG. 3, a support system 30 consists of support block 10, as illustrated in FIGS. 1 and 2, having a galvanized steel channel 31 secured to the top wall 13 with self-tapping screws (not shown). Pipe clamps 32 can be mounted to channel 31 so as to securely fasten a gas or refrigeration pipe to the support block.

Figure 4:
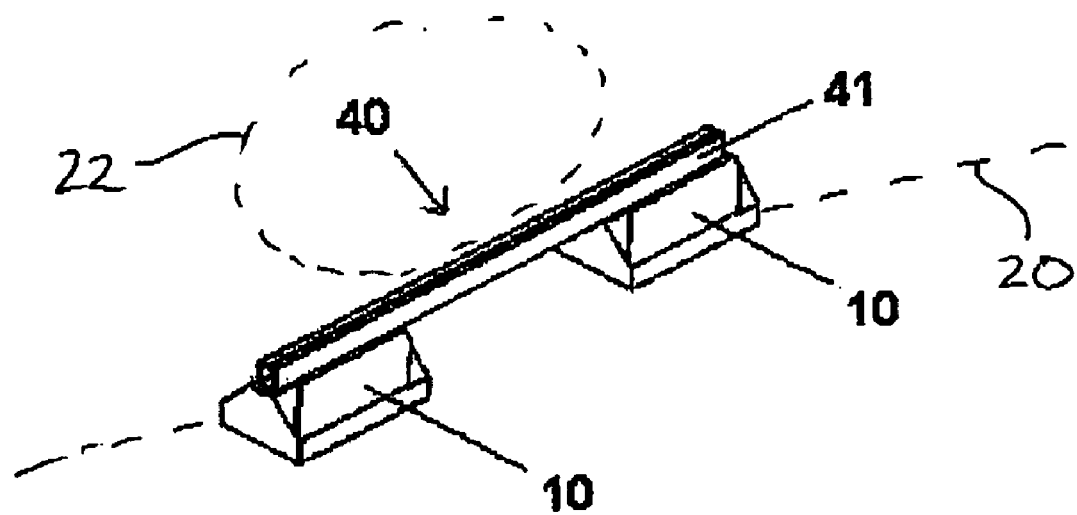
FIG. 4 is an isometric view of two support blocks with interconnecting galvanized steel channel.

An alternative embodiment of the support system is illustrated in FIG. 4. The support system 40 consists of two support blocks 10 having a galvanized steel channel 41 secured to the top wall of each support block with self-tapping screws (not shown) interconnecting the blocks. This embodiment of the support device is sometimes referred to as a sleeper support. This superior vibration dampening sleeper can be used for supporting a variety of large rooftop objects, for example HVAC equipment, cable tray, roof walkway systems and refrigeration equipment.

Figure 5:
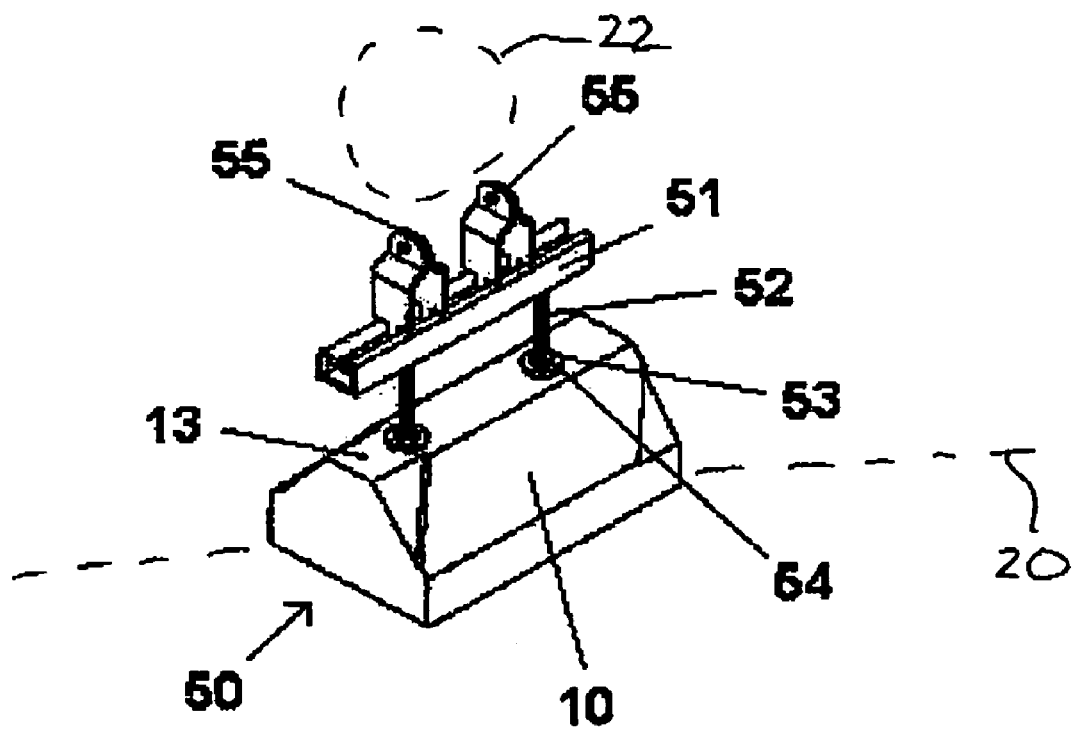
FIG. 5 is an isometric view of a support block with extendable galvanized steel channel.

An alternative embodiment of the support system is illustrated in FIG. 5. The support system 50 consists of support block 10 having a galvanized steel channel 51 secured to the top wall 13 with threaded rods 52, nuts 53, and washers 54. This channel secured to this device can be raised or lowered to the desired position by turning the nuts mounted on the threaded rods. Pipe clamps 55 can be mated to channel 51 so as to securely fasten a gas or refrigeration pipe to the support block.

Figure 6:
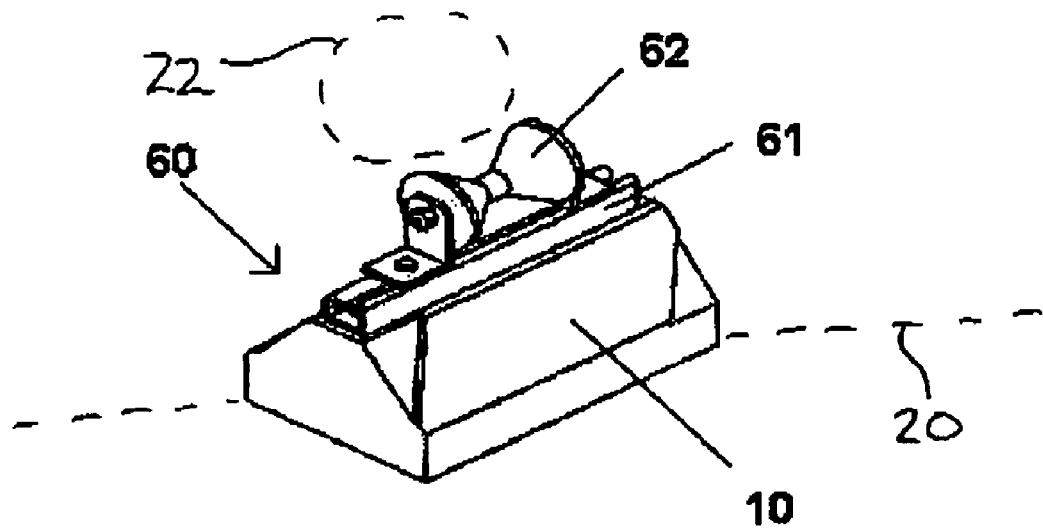
FIG. 6 is an isometric view of a support block with roller support.

An alternative embodiment of the support system is illustrated in FIG. 6. The support system 60 consists of support block 10 having a galvanized steel channel 61 secured to the top wall 13 with self-tapping screws (not shown). A galvanized steel roller clamp 62 is secured to the galvanized steel channel 61. The roller clamp is shaped where the end portions have a larger diameter than the middle portion. The diameters and the degree of taper depend on the size of pipe to be supported.

Figure 7:
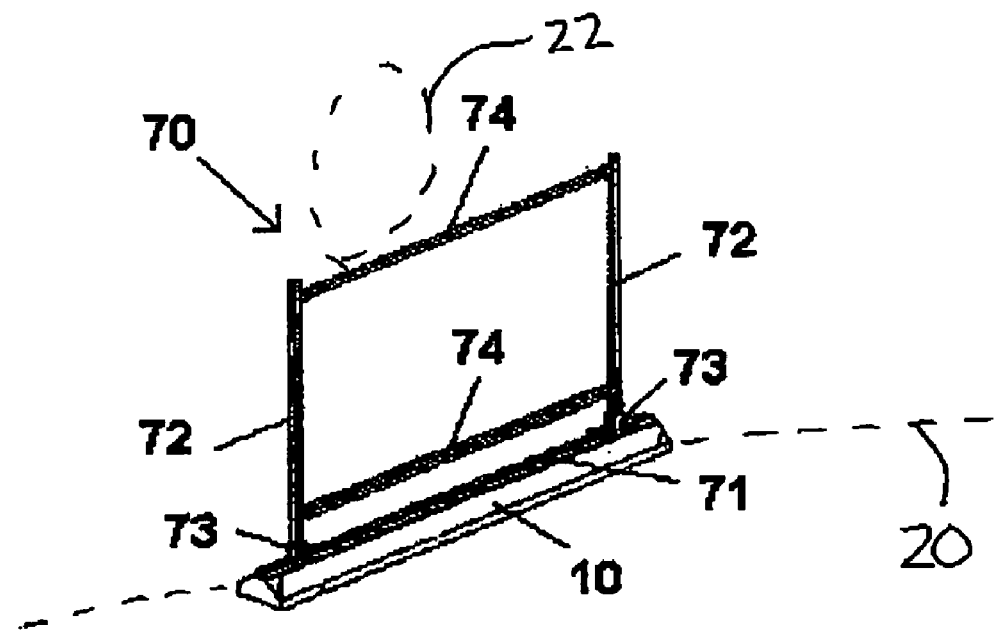
FIG. 7 is an isometric view of a support block with galvanized steel strut.

An alternative embodiment of the support system is illustrated in FIG. 7. The support system 70 consists of support block 10 having a galvanized steel channel 71 secured to the top wall 13 with self-tapping screws (not shown). Steel struts 72 connect to channel 71 with the aid of fittings 73. Cross-members 74 provide rigidity to the rectangular support platform. This support device is particularly useful for supporting large rooftop ductwork.

Figure 8:
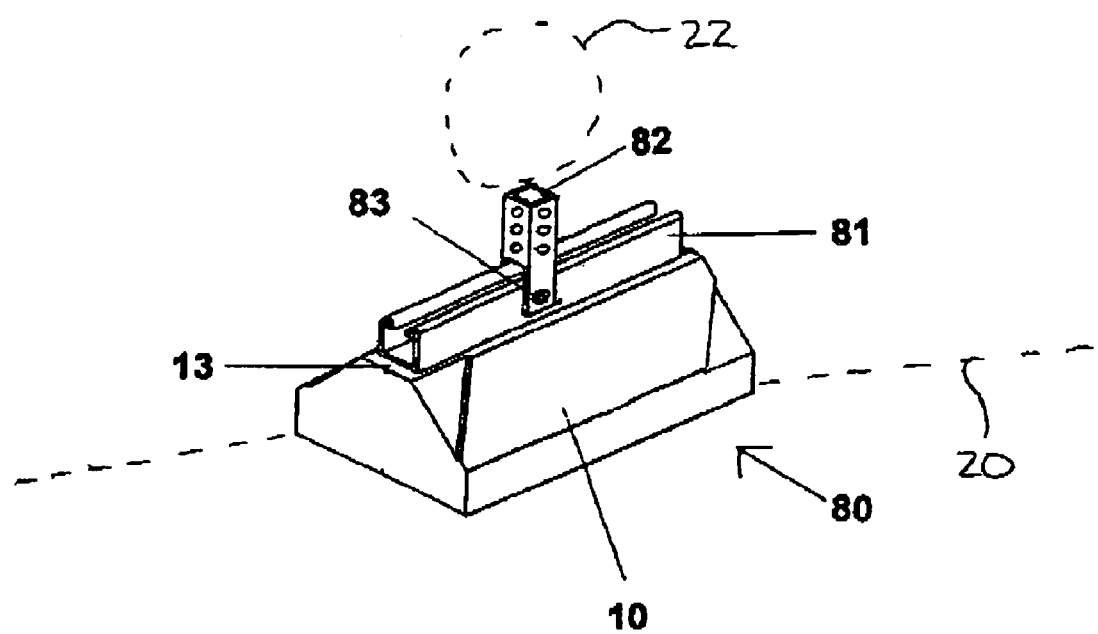
FIG. 8 is an isometric view of a support block with variable angle support.

An alternative embodiment of the support system is illustrated in FIG. 8. The support system 80 consists of support block 10 having a galvanized steel channel 81 secured to the top wall 13 with self-tapping screws (not shown). A variable angle support leg 82 is secured to the channel 81 by means of securing means 83, which securing means 83 may be a bolt (plated) nut with locking washer. In use, the securing means 83 are loosened, the variable angle support leg 82 rotated into the desired position, and the securing means 83 tightened to retain the variable angle support leg 82 at the desired angle.

While specific embodiments of the present invention have been described in the foregoing, it is to be understood that other embodiments are possible within the scope of the invention. For example, some applications may require enhanced vibration dampening. In this case, the support blocks could be moulded from a material of reduced rigidity or be moulded from materials to create layers of differing rigidity within the block. The invention is to be considered limited solely by the scope of the appended claims.

Embodiments of the invention in which an exclusive property or privilege is claimed are defined as follows:

1. A support system in combination with a roof object on a roof and providing vibration dampening to the roof object, said support system comprising:

a substantially hollow block of a self damping elastomeric material having a substantially flat bottom, two end walls perpendicular to the bottom, and a flat top wall;

the hollow block being supported on the roof and beneath the roof object so as to be arranged to provide vibration dampening between the roof object and the roof;

a channel secured to the top wall of the hollow block providing a platform for securing objects;

a clamp mated to the channel, the damn comprising a variable angle leg pivotally coupled to the channel; and a retainer which selectively retains the lea at a desired angle relative to the channel.

2. A support system according to claim 1 wherein the hollow block is moulded as a single piece from an elastomeric material.

3. A support system according to claim 1 wherein the elastomeric material is from recycled tires.

4. A support system according to claim 1 wherein the hollow block is UV resistant to prevent photo-degradation.

5. A support system according to claim 1 wherein there is provided:

a channel secured to the top wall of the hollow block providing a platform for securing objects; and a clamp mated to the channel and securing objects to the channel.

6. A support system according to claim 5 wherein the hollow block is moulded as a single piece from an elastomeric material.

7. A support system according to claim 5 wherein the elastomeric material of the hollow block is from recycled tires.

8. A support system according to claim 5 wherein the hollow block is UV resistant to prevent photo-degradation.

9. A support system according to claim 5 wherein the channel is made from galvanized steel.

10. A support system according to claim 1 wherein the hollow block is secured to the roof with adhesive.

11. A support system according to claim 1 wherein the hollow block comprises hollow cavities formed in the flat bottom of the elastomeric material.

12. A support system in combination with a roof object on a roof providing vibration dampening to the roof object, said support system comprising:

a substantially hollow block of a self damping elastomeric material having a substantially flat bottom, two end walls perpendicular to the bottom, a flat top wall, and hollow cavities formed in the flat bottom of the elastomeric material;

a channel secured to the top wall of the hollow block providing a platform for securing objects;

a clamp mated to the channel comprising a variable angle leg pivotally coupled to the channel; and a retainer which selectively retains the leg at a desired angle relative to the channel;

the hollow block being supported on the roof beneath the roof object so as to be arranged to provide vibration dampening between the roof object and the roof; and the hollow block being secured to the roof with adhesive.

* * * * *

UNITED STATES PATENT AND TRADEMARK OFFICE
CERTIFICATE OF CORRECTION

PATENT NO. : 7,168,210 B2 Page 1 of 1
APPLICATION NO. : 10/703479
DATED : January 30, 2007
INVENTOR(S) : Neil Krovats It is certified that error appears in the above-identified patent and that said Letters Patent is hereby corrected as shown below:

At column 4, line 9:
"the damn comprising" should read "the clamp comprising"

At column 4, line 11:
"retains the lea" should read "retains the leg"

Signed and Sealed this

Twenty-first Day of September, 2010

David J. Kappos
*Director of the United States Patent and Trademark Office*